United States Patent
Wang

(10) Patent No.: US 12,499,274 B2
(45) Date of Patent: Dec. 16, 2025

(54) DATA PROCESSING METHOD AND SYSTEM FOR INTERACTING WITH LARGE LANGUAGE MODELS

(71) Applicant: Droidtown Linguistic Technology Co., Ltd., Zhubei (TW)

(72) Inventor: Wen-Jet Wang, Taoyuan (TW)

(73) Assignee: Droidtown Linguistic Technology Co., Ltd., Zhubei (TW)

( * ) Notice: Subject to any disclaimer, the term of this patent is extended or adjusted under 35 U.S.C. 154(b) by 0 days.

(21) Appl. No.: 18/762,244

(22) Filed: Jul. 2, 2024

(65) Prior Publication Data

US 2025/0094633 A1     Mar. 20, 2025

(30) Foreign Application Priority Data

Sep. 18, 2023    (TW) ................................. 112135499

(51) Int. Cl.
     *G06F 21/62*      (2013.01)
     *G06F 40/35*      (2020.01)

(52) U.S. Cl.
     CPC .......... *G06F 21/6254* (2013.01); *G06F 40/35* (2020.01)

(58) Field of Classification Search
     CPC ............................. G06F 21/6254; G06F 40/35
     See application file for complete search history.

(56) References Cited

U.S. PATENT DOCUMENTS

| | | | |
|---|---|---|---|
| 2019/0188417 A1 | 6/2019 | Mushkatblat | |
| 2024/0296276 A1* | 9/2024 | Hattangady | H04L 51/216 |
| 2024/0311563 A1* | 9/2024 | Somech | G06F 40/295 |
| 2024/0330335 A1* | 10/2024 | Herr | G06F 40/166 |
| 2024/0330421 A1* | 10/2024 | Ailawadi | G06F 21/31 |
| 2024/0338935 A1* | 10/2024 | Pedone | G06V 10/20 |
| 2024/0354436 A1* | 10/2024 | Mukherjee | G06F 16/3344 |
| 2024/0362286 A1* | 10/2024 | He | G06F 16/93 |
| 2024/0362735 A1* | 10/2024 | Lombard | G06Q 10/0635 |
| 2024/0370479 A1* | 11/2024 | Hudetz | G06F 16/316 |
| 2024/0411994 A1* | 12/2024 | Siracusano | G06F 40/205 |
| 2024/0412003 A1* | 12/2024 | Heller | G06F 40/35 |
| 2024/0419658 A1* | 12/2024 | Trache | H04L 67/306 |
| 2024/0419912 A1* | 12/2024 | Somech | G06F 40/279 |
| 2024/0427990 A1* | 12/2024 | Albasiri | G06F 40/211 |

(Continued)

FOREIGN PATENT DOCUMENTS

| | | |
|---|---|---|
| CN | 111386695 A | 7/2020 |
| CN | 112528327 A | 3/2021 |

(Continued)

*Primary Examiner* — Stephen T Gundry

(74) *Attorney, Agent, or Firm* — MUNCY, GEISSLER, OLDS & LOWE, P.C.

(57) ABSTRACT

A data processing method for interacting with large language models, comprising obtaining an original text, analyzing the original text and determining confidential data items in the original text, generating a semantic model representing the relations across the items, converting the confidential data items in the original text into a common word to generate a secure input text, inputting the secure input text to a large language model for processing, receiving a reply text generated by the large language model based on the secure input text, and converting the reply text into a target reply text corresponding to the original text according to the common word and the semantic model.

7 Claims, 10 Drawing Sheets

(56) References Cited

U.S. PATENT DOCUMENTS

| | | | |
|---|---|---|---|
| 2025/0005299 A1* | 1/2025 | Padmanabhan | G06F 16/335 |
| 2025/0005300 A1* | 1/2025 | O'Kelly | G06F 40/205 |
| 2025/0045313 A1* | 2/2025 | Rogynskyy | G06N 3/0475 |
| 2025/0045524 A1* | 2/2025 | Verma | G06F 40/263 |
| 2025/0045537 A1* | 2/2025 | Veliche | G06F 40/58 |
| 2025/0047622 A1* | 2/2025 | Bodigutla | H04L 51/02 |
| 2025/0157209 A1* | 5/2025 | Dharmasiri | G06V 10/454 |
| 2025/0182226 A1* | 6/2025 | Wu | G06Q 10/0637 |

FOREIGN PATENT DOCUMENTS

| | | |
|---|---|---|
| CN | 113935061 A | 1/2022 |
| CN | 114117511 A | 3/2022 |
| TW | 202137083 A | 10/2021 |

* cited by examiner

DATA PROCESSING METHOD AND SYSTEM FOR INTERACTING WITH LARGE LANGUAGE MODELS

FIELD OF THE INVENTION

The invention relates to a data processing method and a data processing system, and more particularly, to a data processing method and a data processing system capable of providing a safe and secure mechanism for interacting with large language models.

BACKGROUND OF THE INVENTION

Large language models (LLMs) can be used to process and understand a large amount of natural language data. Moreover, large language models will also be an important part of the development of artificial intelligence technology. Due to the high computing power and energy costs of training and deploying large language models, most users usually interact with large language models provided by external software companies. However, confidential data or sensitive data of the user may be sent to the large language model during the interaction process, thus introducing certain risk of causing serious consequences. As the confidential data is sent to the large language model, data leakage may occur when the confidential data is unintentionally or maliciously disclosed to unauthorized individuals by the service system of external large language model. Data leakage may have serious consequences for both individuals and companies. For example, for individuals, the leakage of confidential data may lead to identity theft. For companies, the leakage of confidential data may lead to damage to company's reputation, financial loss and legal liability. In particularly, many regulated companies or organizations, such as financial companies, legal institutions, hospitals, are extremely intolerant of confidential information leakage. On the other hand, conventional methods may use public key encryption technique to encrypt information to prevent eavesdropping attacks during transmission. But, this can only prevent the information from being eavesdropped during transmission. The confidential data may still be provided to the service server of the external large language model after decryption in the service server. Moreover, an ordinary string replacement method may be applied to prevent data leakage problem. The confidential information may be replacing with an alias name string or a word whose semantic content is irrelevant to the original text, and thus this method will significantly affect the quality of text context processing and generated results of the large language models. Therefore, there is a need for improvement.

SUMMARY OF THE INVENTION

It is therefore an objective of the present invention to provide a processing method for interacting with large language models that can prevent confidential information from being leaked to large language models without affecting the quality of reply text generated by large language models based on text context, in order to solve the above-mentioned problem.

An embodiment of the present invention discloses a data processing method for interacting with large language models, comprising obtaining an original text, analyzing the original text and determining a confidential data item in the original text. The confidential data item may include one or more groups of confidential data, including personal confidential data, corporate confidential data, official or government confidential data, research project confidential data, official confidential sensitive data or other customized information that cannot be disclosed. For example, the confidential data term may include information of name, gender, phone number, email address, mailing address, national identification number, membership number, age, occupation and hobby. Any information that is protected against unwarranted disclosure and prevented from being known by others (i.e. person other than the user) may be defined as a confidential data item. The present invention converts the confidential data item in the original text into a de-identified common word for masking to generate a secure input text having the effect of masking the confidential data item, stores the semantic mapping model of the confidential data item and the original text into the local end, and inputs the secure input text to a large language model for processing. The present invention further receives a reply text generated by the large language model based on the secure input text and performs an unmasking process on the reply text to convert the reply text into a target reply text corresponding to the original text according to the semantic model of the confidential data item and the original text stored in the local end.

An embodiment of the present invention discloses a data processing system for interacting with large language models, comprising: an information system unit, configured to store instructions; a calculation core module, configured to execute the instructions of: obtaining an original text; analyzing the original text and determining a confidential data item in the original text; generating a semantic model according to sentence structure, semantic content and contextual information associated with the confidential data item in the original text and converting the confidential data item in the original text into a common word for masking, so as to generate a secure input text; inputting the secure input text to a large language model for processing; receiving a reply text generated by the large language model based on the secure input text; and converting the reply text into a target reply text corresponding to the original text for unmasking according to the common word and the semantic model.

DETAILED DESCRIPTION OF THE INVENTION

Certain terms are used throughout the description and following claims to refer to particular components. As one skilled in the art will appreciate, various application fields may refer to a component by different names. The description and following claims does not intend to distinguish between components that differ in name. The description and following claims may distinguish between components that differ in function. In the following description and in the claims, the terms "include" and "comprise" are utilized in an open-ended fashion, and thus should be interpreted to mean "include, but not limited to".

Figure 1:
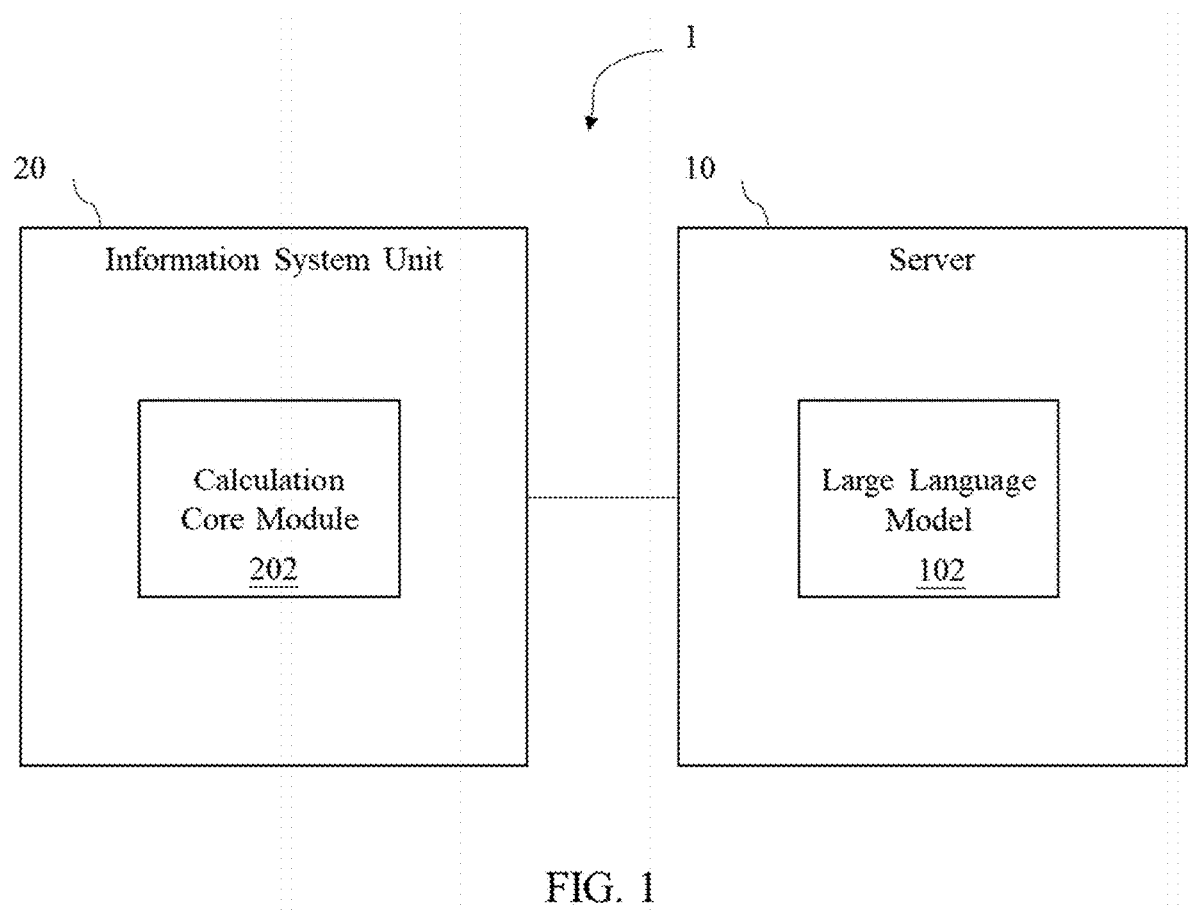
FIG. 1 is a schematic diagram of an information processing system according to an embodiment of the present invention.

Please refer to FIG. 1, which is a schematic diagram of an information processing system 1 according to an embodiment of the present invention. The information processing system 1 includes a server 10 and an information system unit 20 (local end) of the present invention. The server 10 may run a large language model 102. The large language model 102 may include natural language processing (NLP) systems or modules. The large language model 102 may include artificial neural networks. The large language model 102 may be trained by using machine learning methods, but not limited thereto. The large language model 102 may include generative pre-trained transformers (GPT) language model, GPT-2 language model, GPT-3 language model, GPT-4 language model, bidirectional encoder representations from transformers (BERT) language model, ELMo language model, ChatGPT language model, Gemini (formerly known as Bard) language model, Poe language model or Claude language model, but not limited thereto. The information system unit 20 of the present invention may include a calculation core module 202. The information system unit 20 of the present invention may communicate and transmit data with the server 10 through the calculation core module 202. The information system unit 20 may be a mobile phone, a tablet, a notebook, desktop computer, a smart phone, a wearable device or any other electronic device capable of data processing and communication.

Figure 2:
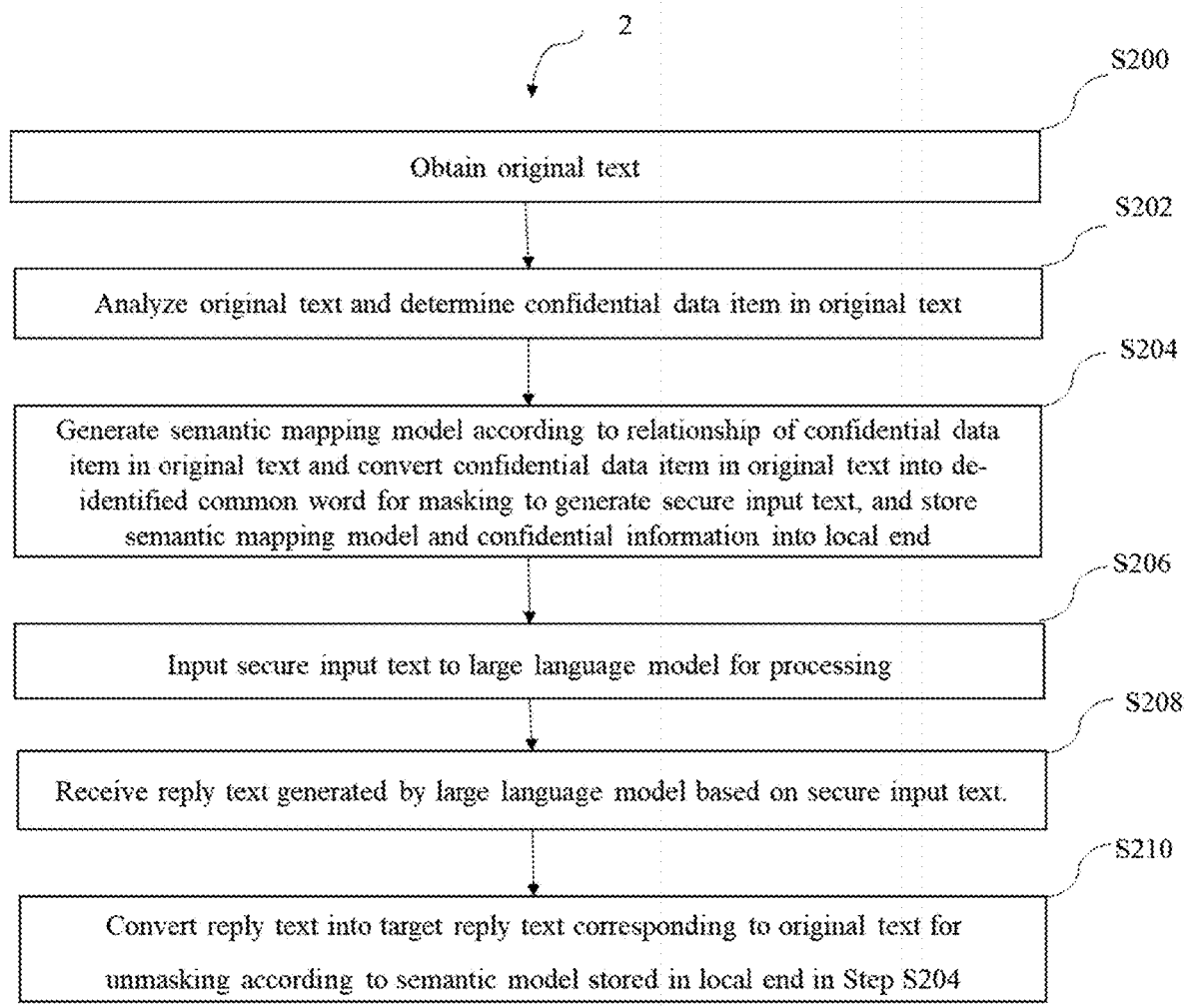
FIG. 2 is a flow diagram of a procedure according to an embodiment of the present invention.

Regarding operations of the information processing system 1, a data processing method of the information processing system 1 may be summarized in an exemplary procedure 2. Please refer to FIG. 2. FIG. 2 is a flow diagram of a procedure 2 according to an embodiment of the present invention. The procedure 2 includes the following steps:

Step S200: Obtain original text.

Step S202: Analyze original text and determine confidential data item in original text.

Step S204: Generate semantic mapping model according to relationship of confidential data item in original text and convert confidential data item in original text into de-identified common word for masking to generate secure input text.

Step S206: Input secure input text to large language model for processing.

Step S208: Receive reply text generated by large language model based on secure input text.

Step S210: Convert reply text into target reply text corresponding to original text for unmasking according to semantic model stored in local end of Step S204.

For example, according to the procedure 2, the user may input an original text 300. Please refer to FIG. 3, the content of the original text 300 is "Patient Zhang Xiaohong (ID No.:A234567890) was admitted to the hospital for three weeks after being checked by Dr. Chen in the emergency department due to physical discomfort . . . ".

Figure 3:
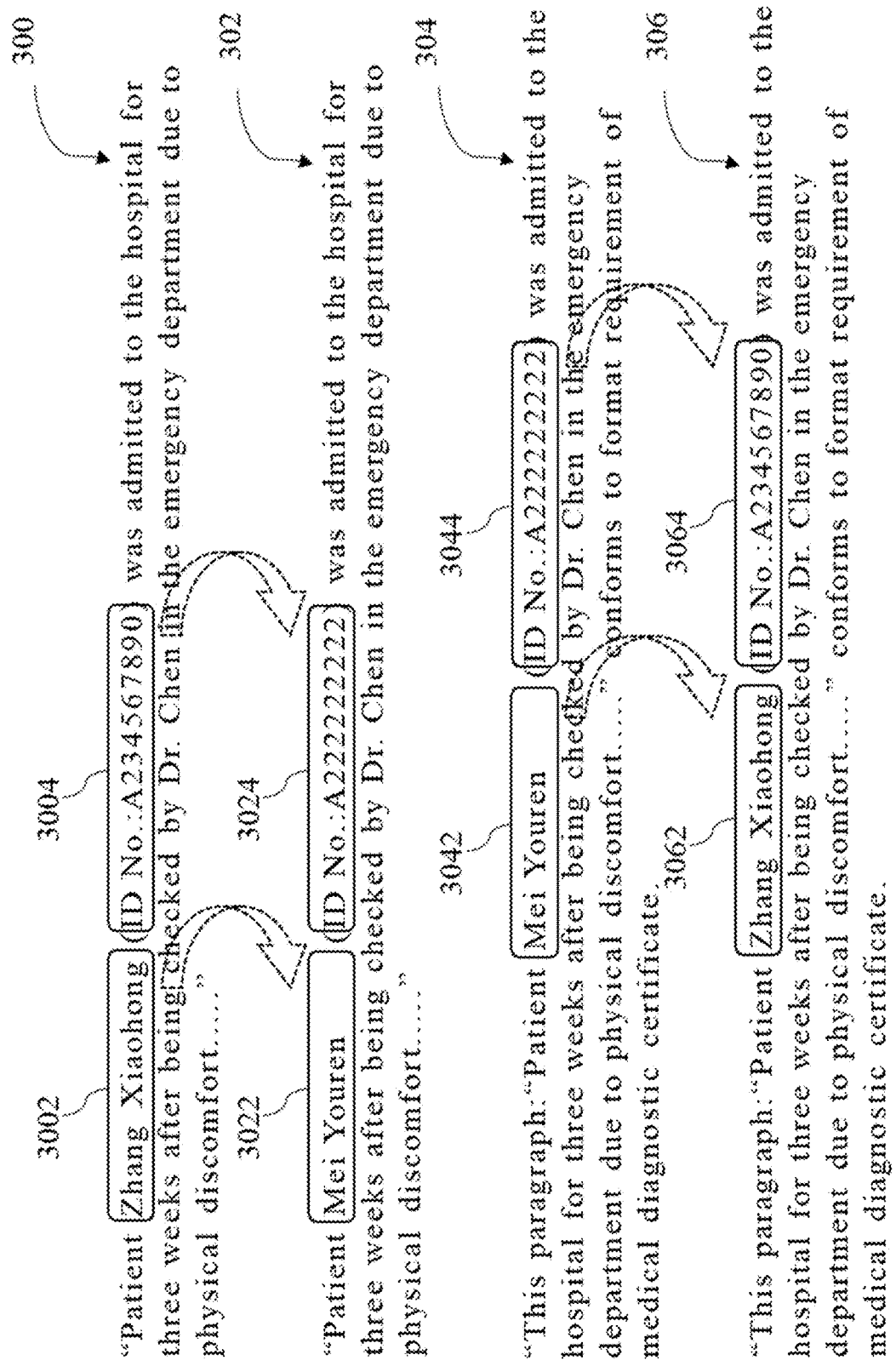
FIG. 3 is a schematic diagram illustrating operations of text conversion according to an embodiment of the present invention.

In Step S202, the calculation core module 202 of the information system unit 20 analyzes the original text and determines confidential information in the original text. The confidential information may include one or more groups of confidential data (also called sensitive data). The confidential data may include personal confidential data, corporate confidential data, official or government confidential data, research project confidential data, official confidential sensitive data or other customized information that cannot be disclosed. For example, the confidential data may include information of name, gender, phone number, email address, mailing address, national identification number (hereinafter referred to as ID number), membership number, age, occupation and hobby. Any information that is protected against unwarranted disclosure may be defined as a confidential data item. Any information that is not intended to be accessible by others (i.e. person other than the user) may be defined as a confidential data item. For example, please refer to FIG. 3, suppose the terms name and ID number have been set as confidential data items in advance. The user inputs the original text 300. As shown in FIG. 3, the content of the original text 300 is "Patient Zhang Xiaohong (ID number: A234567890) was admitted to the hospital for three weeks after being checked by Dr. Chen in the emergency department due to physical discomfort . . . ". The calculation core module 202 may analyze the content of the original text 300. The name property words (e.g., "Zhang Xiaohong" shown in FIG. 3) and the property words of ID number (e.g., "A234567890" shown in FIG. 3) in the original text 300 may be determined as confidential data items.

Figure 4:
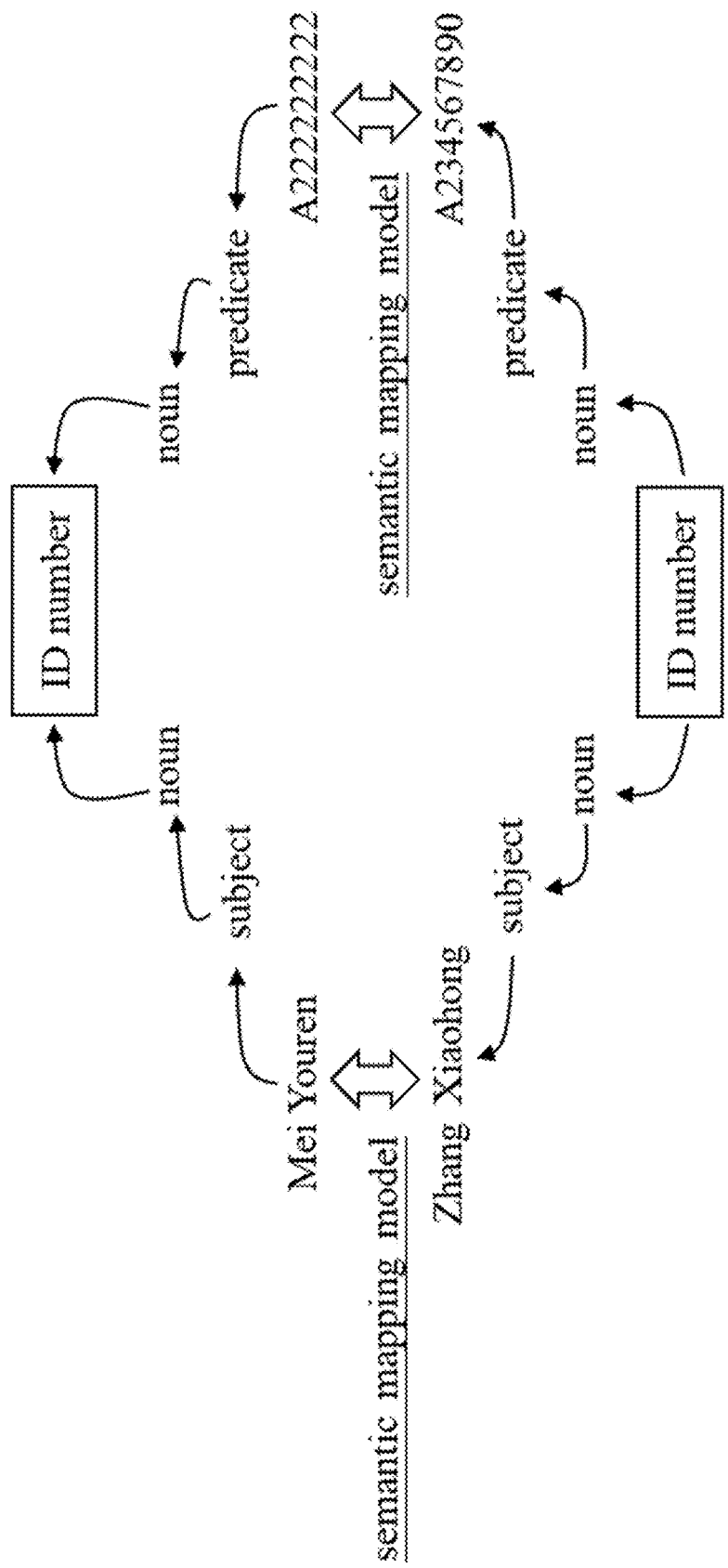
FIG. 4 is a schematic diagram illustrating a semantic mapping model representing relations between the original text and the masked text according to an embodiment of the present invention.

As shown in FIG. 4, the calculation core module 202 generates a semantic mapping model which is sufficient to represent the two confidential data terms in the above-mentioned embodiment according to the original text. For example, the calculation core module 202 may generate the semantic mapping model according to the relationship of the confidential data terms in the original text (e.g., sentence structure, lexical property (lexical attribute), semantics content and contextual information). FIG. 4 shows an example presentation method of the semantic mapping model. The internal logic of the semantic mapping model may be formatted data structures, such as dictionary, list, set relationship, functional relationship or graph relationship database, which are able to represent the semantic relationship between multiple confidential data items.

As shown in FIG. 3, the original text 300 includes confidential data items 3002 and 3004. The confidential data item 3002 is "Zhang Xiaohong". The confidential data item 3004 is "ID number:A234567890".

Figure 5:
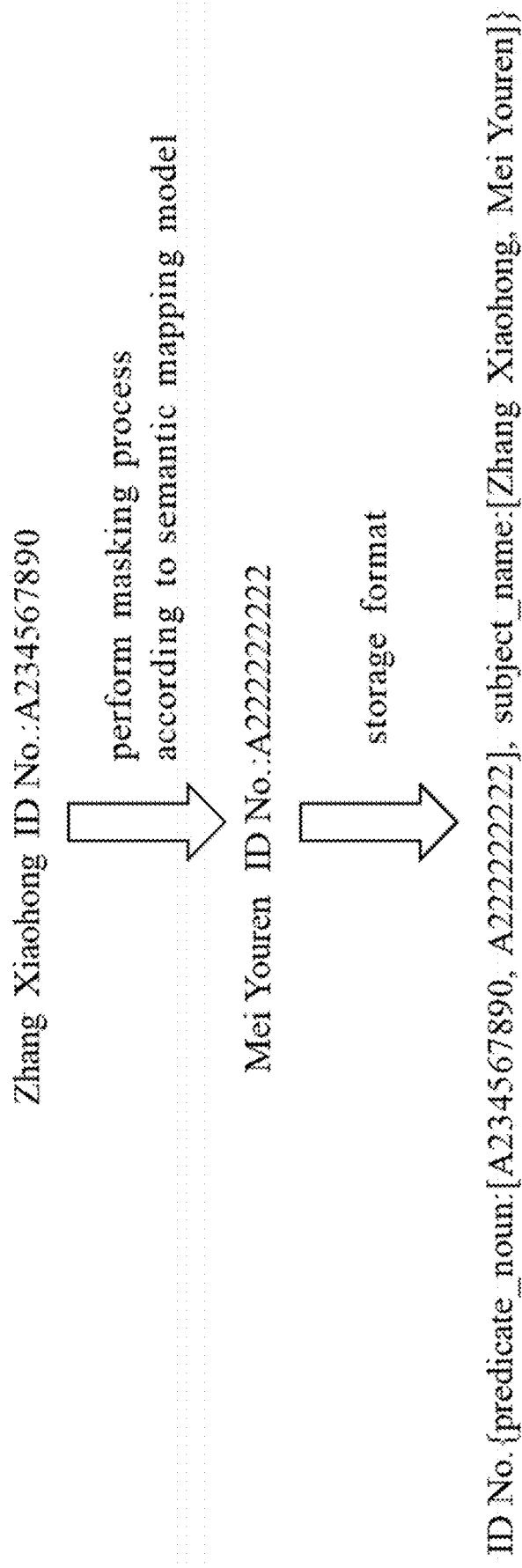
FIG. 5 is a schematic diagram illustrating the masking processing results of the original text and corresponding data storage according to an embodiment of the present invention.
Figure 6:
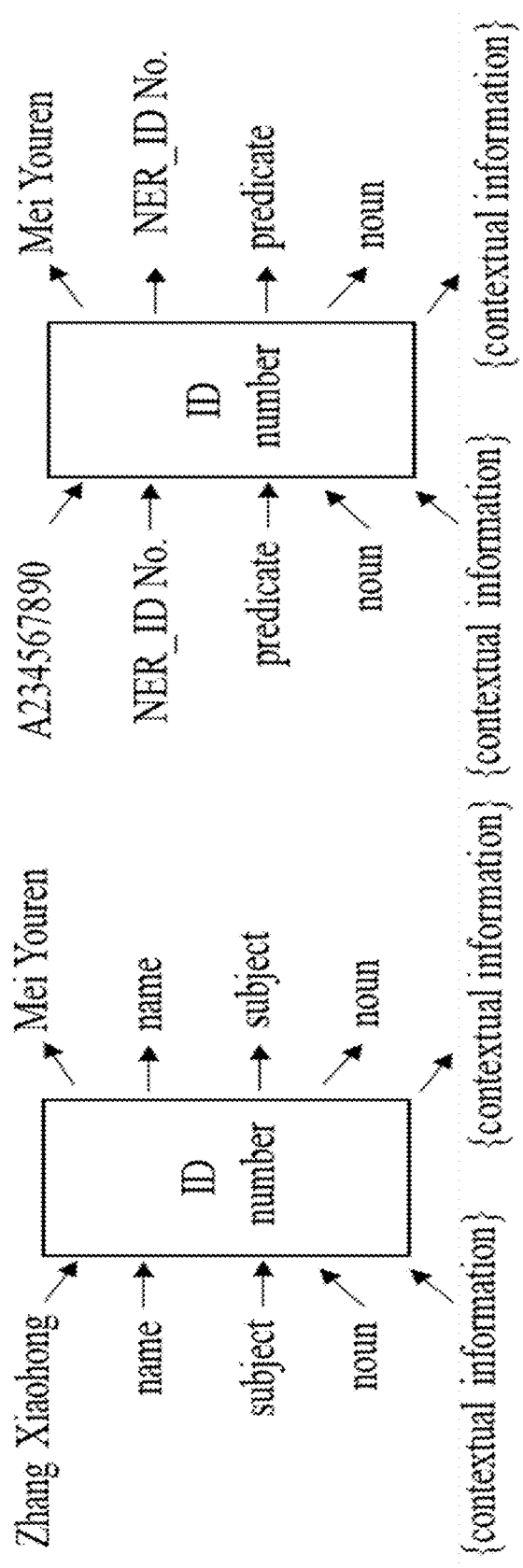
FIG. 6 is a schematic diagram illustrating the semantic mapping model and corresponding data mapping relationship by using a graphical relationship database according to an embodiment of the present invention.

As shown in FIG. 3 and FIG. 5, the calculation core module 202 performs a de-identifying and masking process on the original text by converting the confidential data items in the original text into de-identified common words, so as to generate a secure input text. For example, the calculation core module 202 performs a masking process on the original text to generate a secure input text of "Mei Youren, ID number A222222222". Moreover, the semantic mapping model including the original relationship "ID number (A234567890, Zhang Xiaohong)", and the mapping relationship "{property_name: [Zhang Xiaohong, Mei Youren]}" and "{property_ID number: [A234567890, A222222222]}" may be stored in the local end. The semantic mapping model and mapping relationship may also be stored by using a graphical relationship database shown in FIG. 6. Different presentation methods do not affect the confidential data mapping relationship recorded in the semantic mapping model.

Figure 7:
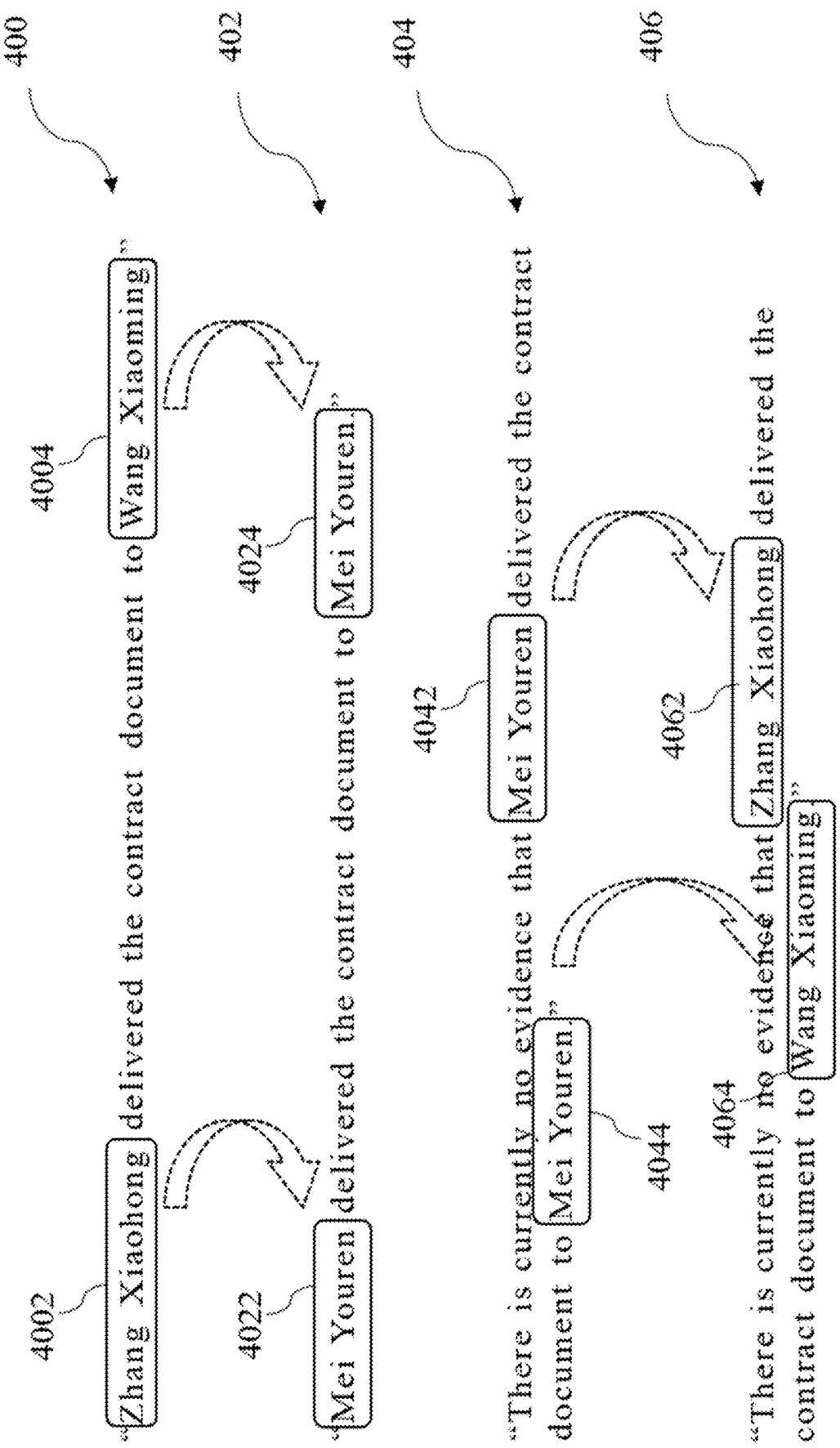
FIG. 7 is a schematic diagram illustrating operations of text conversion according to an alternative embodiment of the present invention.
Figure 8:
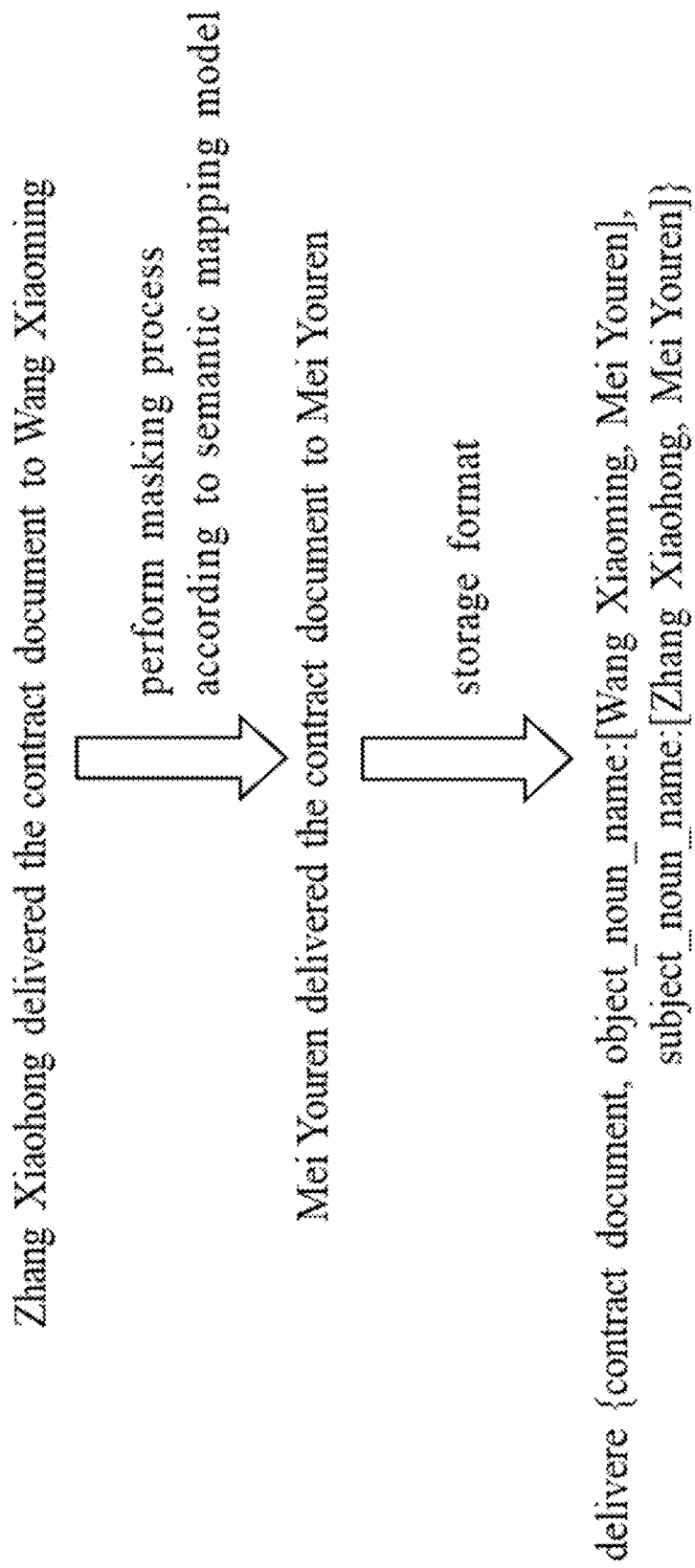
FIG. 8 is a schematic diagram illustrating the masking processing results of the original text and corresponding data storage according to an alternative embodiment of the present invention.
Figure 9:
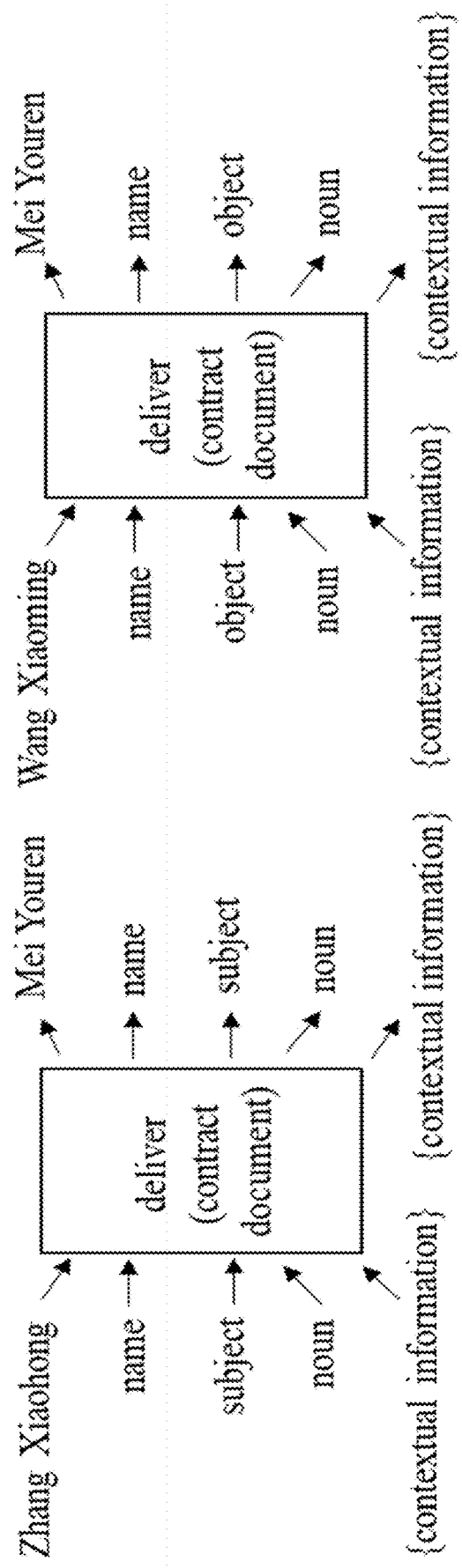
FIG. 9 is a schematic diagram illustrating the semantic mapping model and corresponding data mapping relationship by using a graphical relationship database according to an alternative embodiment of the present invention.

Moreover, please further refer to FIG. 7. As shown in FIG. 7, the content of an original text 400 is "Zhang Xiaohong delivered the contract document to Wang Xiaoming". Suppose the term name has been set as a confidential data item in advance. Therefore, the original text 400 includes confidential data items 4002 and 4004. The confidential data item 4002 is "Zhang Xiaohong". The confidential data item 4004 is Wang Xiaoming". As shown in FIG. 8, the calculation core module 202 performs a masking process on the original text to generate a secure input text 402 of "Mei Youren delivered the contract document to Mei Youren". The semantic mapping model including the original relationship "DELIVER(contract document, Mei Youren, Mei Youren)" as a representation of the argument structure, and the mapping relationship "{property_name: [Zhang Xiaohong, Mei Youren]}" and "{property_name: [Wang Xiaoming, Mei Youren]}" may be stored in the local end. In addition, the semantic mapping model and mapping relationship may also be stored by using a graphical relationship database shown in FIG. 9. Different presentation methods do not affect the confidential data mapping relationship recorded in the semantic mapping model.

Further, after the confidential data items in the original text is determined, the calculation core module 202 may analyze word class (or called part of speech) and word property of the confidential data items. For example, as shown in FIG. 3, the calculation core module 202 determines that the confidential data item 3002 (i.e. Zhang Xiaohong) is a noun and also a name, and the confidential data item 3004 (i.e. A234567890) is a noun and also an ID number. The core calculation module 202 may perform syntax analysis and sentence structure analysis on the original text to determine the argument dependency relationship between the content structure and words of the original text. Moreover, the core calculation module 202 may determine the sentence element categories (or called argument roles, theta roles in linguistics) of the confidential data items in the original text according to the argument dependency relationship between the content structure and words of the original text. For example, the sentence element category may include subject, verb, object, object complement or modifier, but not limited thereto. For example, as shown in FIG. 4, the calculation core module 202 determines that the confidential data item 4002 (i.e. Zhang Xiaohong) is a noun and a name, and also a subject of a sentence in the original text 400. The calculation core module 202 determines that the confidential data item 4004 (i.e. Wang Xiaoming) is a noun and a name, and also an object of the sentence in the original text 400. The argument dependency relationship may be presented in the form of "verb (first object, second object, subject)" according to the syntax and sentence structure, such that the semantic model of the argument relationship representing "DELIVER(contract document, Wang Xiaoming, Zhang Xiaohong)" is able to be converted into the semantic model of the argument relationship representing "DELIVER(contract document, Mei Youren, Mei Youren)" may be stored in the local end.

Figure 10:
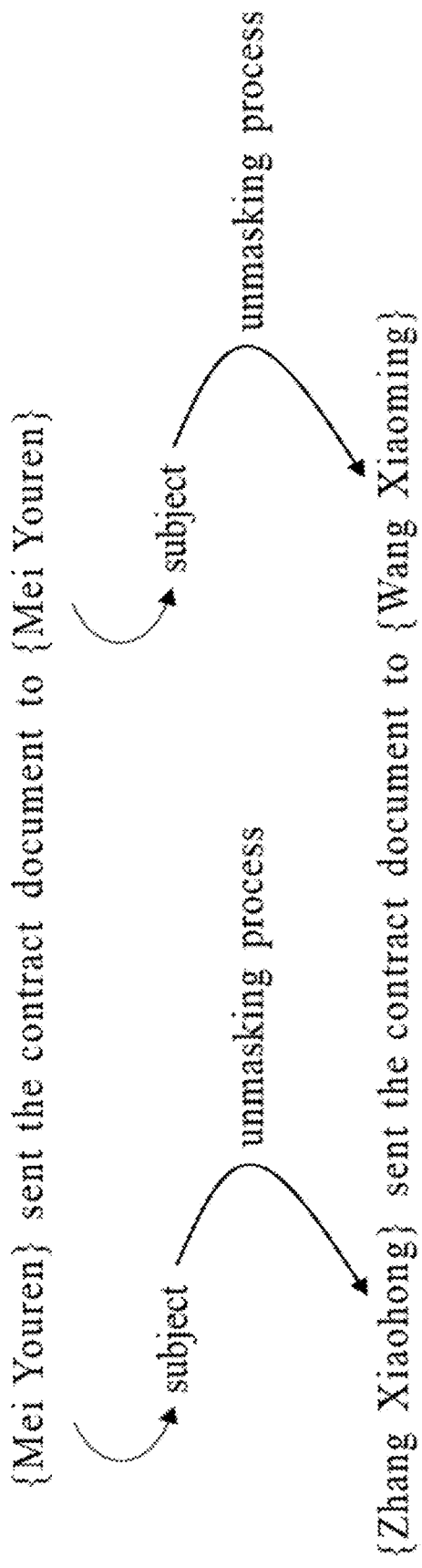
FIG. 10 is a schematic diagram illustrating the operation of performing unmasking processing on the reply text replied by the large language model to convert it into the unmasked target reply text according to an embodiment of the present invention.

As shown in FIG. 7, after above-mentioned masking processing, the original text 400 may be masked and converted into the secure input text 402 including the content of "Mei Youren delivered the contract document to Mei Youren". Moreover, when obtaining the reply text 404 replied by the large language model, the content of the reply text 404 may be processed into a semantic model. For example, the content of the semantic model may be represented as "SEND(contract document, Mei Youren, Mei Youren)", and the semantic similarity between "SEND" and "DELIVER" may be compared. These two "Mei Youren" are mapped to the subject and the second object in the original text, respectively. As shown in FIG. 10, the calculation core module 202 may perform an unmasking process on these two "Mei Youren" according to the semantic relationship during the masking process, such that the two "Mei Youren may be recovered into "Zhang Xiaohong" and "Wang Xiaoming", respectively. That is, "There is currently no evidence that Zhang Xiaohong sent the contract documents to Wang Xiaoming" as shown in sentence 406.

In embodiments of the present invention, the mapping relationship between confidential data items and common words may be predetermined in advance (e.g., all names are replaced with "Mei Youren", all addresses are replaced with "No. 1, Shuiliandong Road, Huaguoshan" or user-defined substitution words). The mapping relationship between confidential data items and common words may be stored in a lookup table available in the local end. As such, after the semantic model is generated, the calculation core module 202 may convert the confidential data items of the original text into corresponding common words according to contents of the lookup table, so as to generate the secure input text with masking effects.

After the masking conversion process is performed, the secure input text 302 still maintains the abstract property of the natural language structure (that is, the person's name is still a person's name, but the real name has already been replaced with a pseudonym). Therefore, when the secure input text 302 is inputted to the large language model 102, the large language model 102 can still generate suitable text as the reply text after interaction. Moreover, the original confidential data items in the secure input text 302 have been converted into de-identified common words for masking, and the de-identified common words are no longer considered confidential and sensitive, thus ensuring that the confidential information cannot be stolen or leaked.

Please further refer to FIG. 7. Multiple masked data items (e.g., common words) may be generated after performing the masking process on the confidential data items. However, the multiple masked data items may not be distinguished according to the literal meaning (e.g., the reply text 404 shown in FIG. 7). Since conventional method usually merely performs replacement processing based on literal symbols, it will be impossible to perform unmasking processing to recover the masked data items. In comparison, the embodiments of the present invention can perform unmasking process based on the analyzed semantic mapping model of the original text, rather than merely replacing based on literal symbols. Therefore, the embodiments of the present invention can implement the recovery and replacement of the masked data items.

In Step S210, the calculation core module 202 converts the reply text into a target reply text corresponding to the original text according to the common words. Since the common words are utilized to replace confidential data items in the conversion process of Step S204. In Step S210, the calculation core module 202 may analyze the reply text and determine whether there are common words utilized by the conversion process of Step S204 in the reply text. When it is determined that there are common words in the reply text, the calculation core module 202 may analyze and determine the word class, word property and sentence element category of the determined common words. The calculation core module 202 may convert the common words in the reply text into corresponding confidential data items according to at least one of the word class, word property and sentence element category of the common words, so as to generate a corresponding target reply text corresponding to the original text.

For example, in Step S210, the calculation core module 202 may perform an unmasking process on the common words in the reply text by converting the common words into the confidential data items according to the word class, semantic content and contextual information of the common words in the reply text, so as to generate a target reply text corresponding to original text. Please further refer to FIG. 3. The calculation core module 202 may analyze the content of the reply text 304 replied by the large language model and determine that the term name "Mei Youren" and the term ID number "A222222222" in the reply text 304 are common words to be utilized in the conversion process of Step S204 for masking. That is, the calculation core module 202 determines that the reply text 304 includes the common word 3042 (i.e. Mei Youren) and the common word 3044 (i.e. A222222222) utilized for masking. Further, the calculation core module 202 determines that the common word 3042 (i.e. Mei Youren) is a noun and the semantic property of the common word 3042 (i.e. Mei Youren) is a name. The calculation core module 202 determines that the common word 3044 (i.e. A222222222) is a noun and the semantic property of the common word 3044 (i.e. A222222222) is an ID number. Since the confidential data item 3002 (i.e. Zhang Xiaohong), which is a noun and has a semantic property of name, is converted into a common word 3022 (i.e. Mei Youren) by the calculation core module 202 during the conversion procedure in Step S204. Accordingly, in Step S210, the calculation core module 202 may analyze the content of the reply text 304. When determining that the common word 3042 (Mei Youren) in the reply text 304 is a noun and also a name, the calculation core module 202 may replace the "Mei Youren" in the reply text 304 with "Zhang Xiaohong" according to the semantic mapping model. As such, the common word 3042 is converted into a confidential data item 3062 and therefore a target reply text 306 corresponding to original text 300 is generated. Similarly, when the calculation core module 202 determines that the common word 3044 (i.e. A222222222) is a noun and also an ID number, the calculation core module 202 may replace the "A222222222" in the reply text 304 with "A234567890" according to the semantic mapping model, such that the common word 3044 is converted into a confidential data item 3064 and therefore the target reply text 306 corresponding to the original text 300 is generated. As shown in FIG. 3, the content of the target reply text 306 corresponding to the original text 300 is "This paragraph: "Patient Zhang Xiaohong (ID No.:A234567890) was admitted to the hospital for three weeks after being checked by Dr. Chen in the emergency department due to physical discomfort . . . " conforms to format requirement of medical diagnostic certificate". As a result, since the converted secure input text conforms to the natural language structure and its language fluency characteristics is also maintained, the secure input text can still be utilized to interact with external large language model. More particularly, the conversion operations of de-identifying and masking, recovering and unmasking for all the confidential data are performed at the local end device 20 of the user, thus providing complete protection for confidential and personal information in the original text. For the users, because the confidential data does not leave the local end device at all, the confidential data may not be recorded or used by the external large language model during interaction. Moreover, after the confidential data setting is completed, all of confidential data conversion and recovery process are completely performed by the information system unit 20 installed on the local device of the user, such that the user may not experience additional external network delay or other inconveniences during use.

For example, in Step S210, the calculation core module 202 may convert the common words in the reply text into corresponding confidential data items according to the word class, word property and sentence element category of the common words, so as to generate the target reply text corresponding to the original text. Please further refer to FIG. 7. The calculation core module 202 may analyze the content of the reply text 404 replied by the large language model and determine that the first name term "Mei Youren" and the second name term "Mei Youren" in the reply text 404 are common words to be utilized in the conversion process of Step S204 for masking. That is, the calculation core module 202 determines that the reply text 404 includes the common word 4042 (i.e. Mei Youren) and the common word 4044 (i.e. Mei Youren) utilized for masking. The calculation core module 202 determines that the common word 4042 (i.e. Mei Youren) is a noun and the semantic property of the common word 4042 (i.e. Mei Youren) is a name, and is also a subject of a sentence in the reply text 404. Further, the calculation core module 202 determines that the common word 4044 (i.e. Mei Youren) is a noun and the semantic property of the common word 4044 (i.e. Mei Youren) is a name, and is also a second object of the sentence in the reply text 404. Since the confidential data item 4002 (i.e. Zhang Xiaohong) is converted into a common word 4022 (i.e. Mei Youren) by the calculation core module 202 during the conversion procedure in Step S204, and the common word 4022 (i.e. Mei Youren) is a noun and a name, and also a subject of the secure input text 402. Under such a situation, when determining that the common word 4042 (i.e. Mei Youren) is a noun and a name, and also a subject of the reply text 404, the calculation core module 202 may replace the first name term "Mei Youren" (i.e. common word 4042) in the reply text 404 with "Zhang Xiaohong" having the same property, such that the common word 4042 is converted into a confidential data item 4062 and therefore a target reply text 406 corresponding to original text 400 is recovered. Similarly, since the calculation core module 202 converts the confidential data item 4004 (i.e. Wang Xiaoming) into a common word 4024 (i.e. Mei Youren), and the common word 4024 (i.e. Mei Youren) is a noun and a name, and also a first object of the secure input text 402 during the conversion procedure in Step S204. when determining that the common word 4044 (i.e. Mei Youren) is a noun and a name, and also an object of the reply text 404, the calculation core module 202 may replace the second name term "Mei Youren" (i.e. common word 4044) in the reply text 404 with "Wang Xiaoming", such that the common word 4044 is converted into a confidential data item 4064 and therefore a target reply text 406 corresponding to original text 400 is recovered. As shown in FIG. 7, the content of the target reply text 406 corresponding to the original text 400 is "There is currently no evidence that Zhang Xiaohong delivered the contract document to Wang Xiaoming". Therefore, during the interaction with the large language model 102, the confidential data has been converted in the information system unit 20 at the local end device used by the user, and thus, no confidential data may be leaked. Moreover, since the secure input text conforms to the natural language structure, the secure input text can still be utilized to interact with external large language model to obtain corresponding interactive replies.

Those skilled in the art should readily make combinations, modifications and/or alterations on the abovementioned description and examples. The abovementioned description, steps, procedures and/or processes including suggested steps can be realized by means that could be hardware, software, firmware (known as a combination of a hardware device and computer instructions and data that reside as read-only software on the hardware device), an electronic system or combination thereof. An example of the means may be the information system unit 20. Examples of hardware can include analog, digital and/or mixed circuits known as microcircuit, microchip, or silicon chip. For example, the hardware may include application-specific integrated circuit (ASIC), field programmable gate array (FPGA), programmable logic device, coupled hardware components or combination thereof. In another example, the hardware may include general-purpose processor, microprocessor, controller, digital signal processor (DSP) or combination thereof. Examples of the software may include set(s) of codes, set(s) of instructions and/or set(s) of functions retained (e.g., stored) in a storage device, e.g., a non-transitory computer-readable medium. The non-transitory computer-readable storage medium may include read-only memory (ROM), flash memory, random access memory (RAM), subscriber identity module (SIM), hard disk, floppy diskette, or CD-ROM/DVD-ROM/BD-ROM, but not limited thereto. The information system unit 20 of the embodiments of the invention may include the calculation core module 202 and a storage device. Any of the abovementioned procedures and examples above may be compiled into program codes or instructions that are stored in the storage device or a computer-readable medium. The calculation core module 202 may read and execute the program codes or the instructions stored in the storage device storage device or computer-readable medium for realizing the abovementioned functions.

To sum up, the embodiments of the present invention may convert confidential data into non-confidential secure input text at the local end device of the electronic device so as to avoid data leakage. Moreover, since the converted secure input text of the embodiments still maintains natural language characteristics, the secure input text can still be utilized to interact with external large language model, thus providing a safe and secure mechanism for interacting with large language models for users.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing method for interacting with large language models, comprising:
    obtaining an original text;
    analyzing the original text and determining a confidential data item in the original text;
    generating a semantic model according to sentence structure, semantic content and contextual information associated with the confidential data item in the original text the semantic model stores the mapping relationship of at least one of word class, word property, sentence element category and contextual information of the confidential data item, and converting the confidential data item in the original text into a common word for masking, so as to generate a secure input text;
    inputting the secure input text to a large language model for processing;
    receiving a reply text generated by the large language model based on the secure input text; and
    converting the reply text into a target reply text corresponding to the original text for unmasking according to the common word and the semantic model.

2. The data processing method of claim 1, further comprising:
    performing a de-identifying and masking process on the original text by converting the confidential data item into the common word according to at least one of word class, word property, sentence element category and contextual information of the confidential data item, and accordingly generating the secure input text.

3. The data processing method of claim 2, further comprising:
    converting the common word into the confidential data item according to at least one of word class, word property, sentence element category and contextual information of the common word for generating the target reply text.

4. The data processing method of claim 1, wherein the confidential data item is different from the common word.

5. The data processing method of claim 1, wherein the confidential data item belongs to the same word class as the common word.

6. The data processing method of claim 1, wherein the target reply text conforms to a natural language structure.

7. The data processing method of claim 1, wherein the large language model is ChatGPT language model, Gemini (formerly known as Bard) language model, Poe language model or Claude language model.

* * * * *